INVENTOR.
JOHN HASUND
BY
Owen, Wickersham & Erickson
ATTORNEY

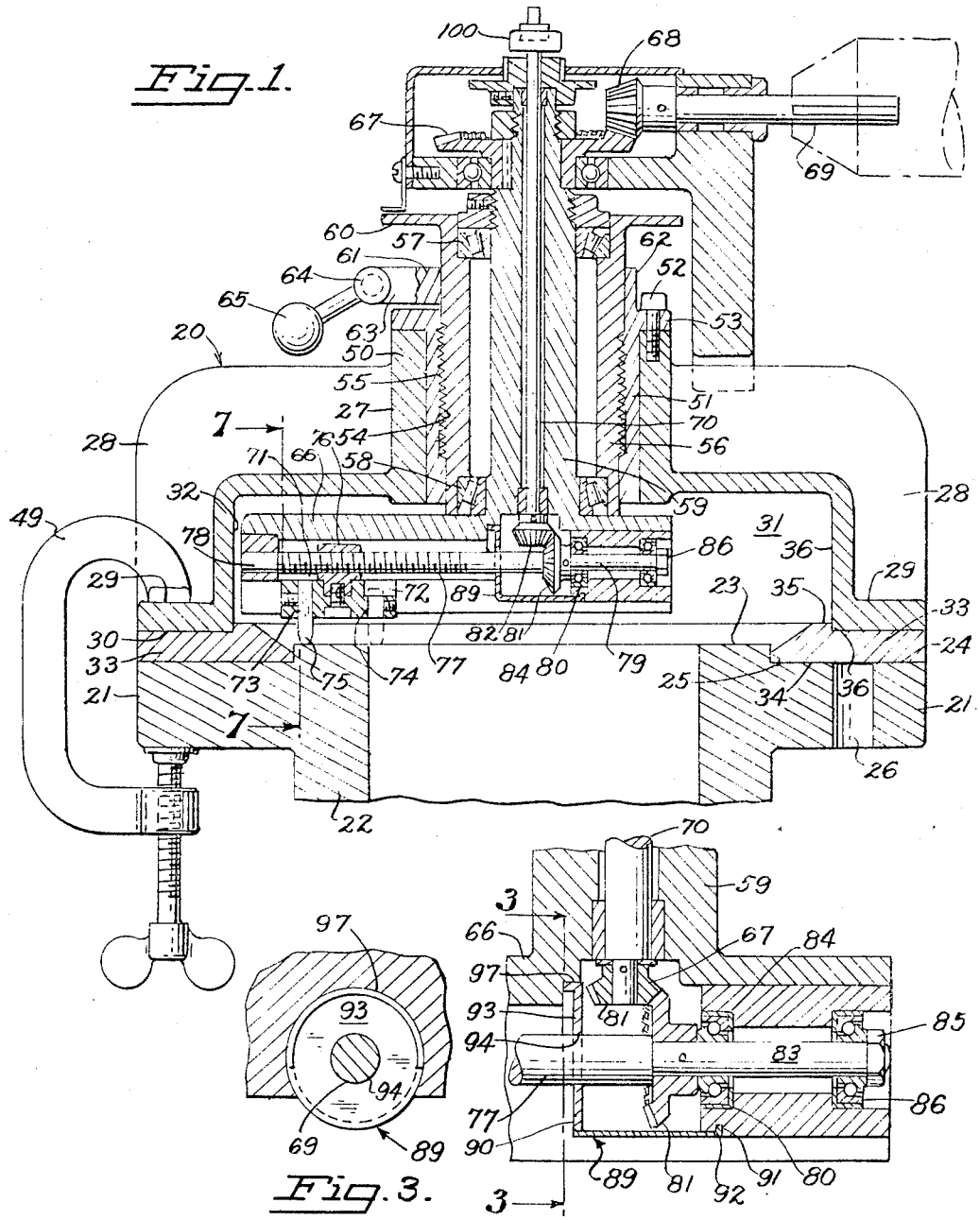

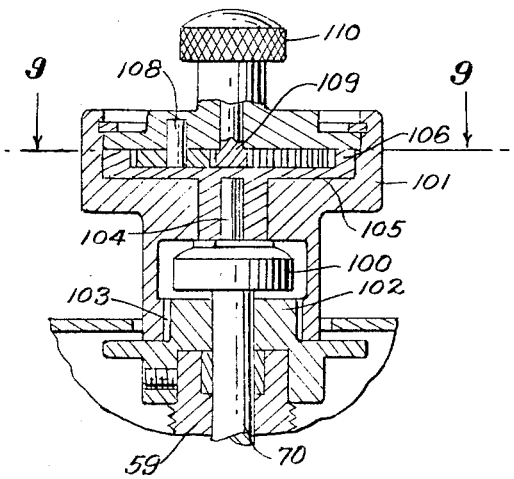
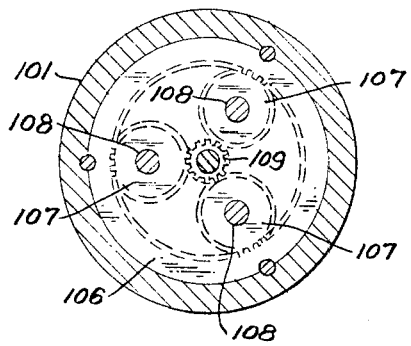
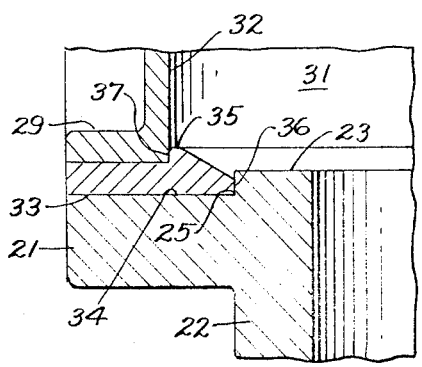
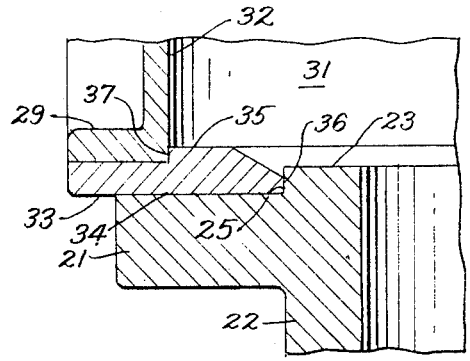
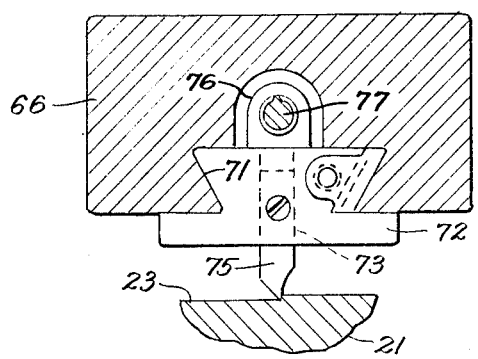
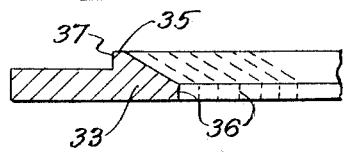
INVENTOR.
JOHN HASUND Sept. 20, 1966  J. HASUND  3,273,432
UNIVERSAL SELF-CENTERING FLANGE FACING DEVICE
Filed July 10, 1964  3 Sheets-Sheet 3

United States Patent Office 3,273,432
Patented Sept. 20, 1966

3,273,432
UNIVERSAL SELF-CENTERING FLANGE
FACING DEVICE
John Hasund, Alameda, Calif., assignor to Thomas A.
Short Company, Oakland, Calif., a corporation of California
Filed July 10, 1964, Ser. No. 381,837
3 Claims. (Cl. 82—4)

This invention relates to an improved flange facing tool and also to means for adapting such tools for use in situ without the necessity of removing the flange to be faced from the place where it is installed.

In constructing, repairing and maintaining large conduit systems and the like it is necessary to provide a smooth uniformly machined surface on the face of flanged valves and other similar fittings. With large valves and other like objects requiring a resurfacing of a flange face before reassembly, the usual practice heretofore was to remove them from the ship or power station or steam plant and transport them to a shop to be worked on. Not only was this long established practice wasteful of time, but it also made it expensive to comply with the governmental regulations which call for this resurfacing of every flange face prior to reassembly. Many economies can be realized if the resurfacing can be done in situ and my invention is directed to solving the problems which this has always presented.

The flanges to be resurfaced on a ship, for example, will be in the steam system as well as in the sea water piping. The flanges will be on the faces of valve housings and on the ends of pipes and pipe couplings. In size, these flanges will vary from a few inches in diameter up to 15 inches or even larger. One of the problems prior to the present invention was to get a single tool that would do this job and a tool that dispensed with mounting the valve body or pipe couplings in a large lathe using a special jig.

Also on shipboard or in a power station, the angle at which the flange to be resurfaced has to be held while resurfacing often is not level, and if working on a flange inside a large tank the surface may be in a vertical plane. The problem of doing this job in situ is further complicated by the one mentioned above of the different sized flanges encountered. The present invention solves these problems in a very effective manner.

Another problem on shipboard or around a powerhouse is the lack of space in which to store a large and expensive piece of equipment as used heretofore in shops for resurfacing flanges. My invention has solved this problem by providing a small (by previous standards) portable, easily stored, relatively inexpensive, combination of parts which can be put together when needed to resurface a flange.

Government regulations on some flange resurfacing call for providing a serrated face, for example, with 32 serrations to the inch. On some faces a smoother cut is desirable. My invention has solved the problem of doing this with a small easily stored, inexpensive tool.

Another important object of the present invention is to provide a flange facing tooling having a rotatable central drive member axially aligned with the bore axis of the flanged fitting being surfaced and attached to a radially extending arm or tool holder housing having a rotating feed screw, and wherein the interconnecting gears for the drive member and the screw are enclosed by an easily installed and removable housing. This feature serves to overcome the problem of excessive wear with the interconnecting gears of the feed system on the device and assures a long life and precision accuracy in the mechanism.

Still another object of the invention is to provide a flange surfacing tool that is strong and durable, yet unusually light and easy to handle because of its unique construction.

There are other problems not touched on above, but it is believed that the foregoing will help to point up the objects of my invention, which are to provide a rugged, simple, relatively inexpensive, easily stored, fool-proof flange surfacing tool which can be taken right to the job, set up in a minimum of time, and accomplish the resurfacing operation with a speed heretofore unheard of.

Other objects and advantages of my invention will become apparent to the man skilled in this art from the following description taken in connection with the drawings. Also it will be recognized that the form of the several parts constituting my device may be varied and still embody my invention. To comply with the statute I shall illustrate and describe one form which I have found to operate with good results.

In the drawings:
FIG. 1 is a view in elevation and in section showing a device embodying the features of the present invention in position on the flange of a fitting, with the cutting tool part way through a facing operation;

FIG. 2 is an enlarged fragmentary view in section showing the beveled drive gears in the protective housing according to the invention;

FIG. 3 is a view in section taken along line 3—3 of FIG. 2;

FIGS. 4 and 5 are enlarged views in cross section of a portion of the flange to be surfaced, of the frame of the device, and of the positioning adapter ring, showing how the size of the latter can be varied to accommodate the device for surfacing flanges of different diameters;

FIG. 6 is a diagrammatic representation in cross section of adapters of different sizes or increments;

FIG. 7 is an enlarged view in cross section taken along the line 7—7 of FIG. 1;

FIG. 8 is an enlarged view in section of a portion of the top of the device of FIG. 1 showing the mechanism for reversing, as well as for slowing the speed of the tool feed on the device;

FIG. 9 is a view in cross section taken along the line 9—9 of FIG. 8;

Figure 10:
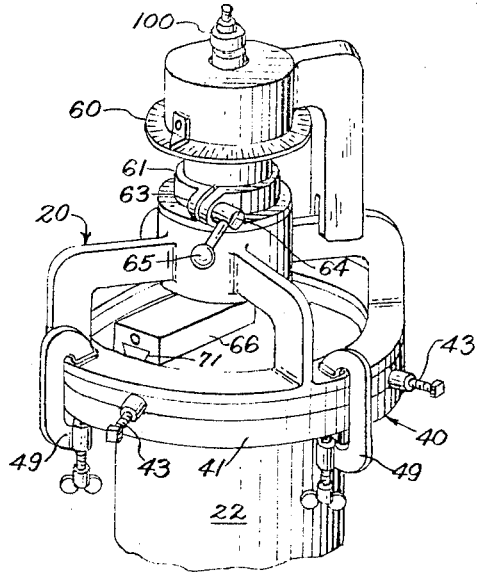
FIG. 10 is a view in perspective of the device secured in the operative position and utilizing a four jaw chuck for aligning the device on the flange being faced.

Referring to the drawings, FIG. 1 shows a flange facing tool 20 according to the invention secured to the flange 21 of a pipe or valve body 22. Usually such a flange 21 will have an inner face 23 in a plane parallel to a recessed outer face 24, with these two offset faces being separated by a cylindrical rim 25. There is a like face 23 and 24 on the pipe or other body (not shown) to be coupled to the pipe or valve body 22 by means of bolts or studs secured in a series of holes 26 in each flange 21. The basic purpose of my invention is to provide means for quickly and accurately resurfacing each face 23 while the pipe or body of which it is a part remains in the ship, powerhouse, or on the floor at its place of use, and does not have to be brought to a specially equipped shop and mounted within a large stationary machine such as a lathe or milling machine.

In general, the facing tool 20 comprises an annular housing or frame 27 having a series of web-like legs 28 extending radially and downwardly therefrom and secured to an annular ringlike base 29 having a larger outer diameter than the housing. The latter has a flat bottom surface 30 and a cylindrical cavity 31 formed by an inner wall surface 32. It should be remembered that the device of my invention will be used on shipboard and in other like locations where the valve body or pipe, of which the flange 21 is a part, supports the flange 21 in a vertical position, or even in an inverted position, so the face 23 to be resurfaced is facing downwardly. All of these conditions make it difficult to set up to do the job and to assure that the cutting device will not move out of axial alignment during its operation.

Thus, an important part of my invention is the provision of a unique method and apparatus for positioning the facing tool 20 properly in a generally central axial alignment with the axis of the flange bore, and with the plane of the bottom of the tool parallel with the plane of the flange bore.

In the present invention I can accomplish this positioning of the tool in either of two ways. In the first instance I provide a series of rings 33, each one of which functions on a particular size of flange to position the cutting tool 20 in a generally central axial alignment with the axis of the bore 34 of the flange. The FIGS. 4, 5 and 6 illustrate how a ring 33 is used in setting up the cutting tool 20 with a base having an inner rim 35, and how a series of rings 33 can enable the tool 20 to fit assorted sizes of flanged members. In FIG. 4 the cutting device is secured against misalignment by the ring 33 whose inner periphery 36 fits against the rim 25 on the flange 21 and centers the tool rim 35 which fits against an outer rim 37 on the ring 33. In FIG. 5 is a like mounting of the cutting device, but notice here the diameter of the rim 25 on the flange is smaller, meaning of course, that the pipe or valve body 22 to which it is secured has a smaller bore 34. This calls for a ring 33 having a smaller diameter at 36. In FIG. 6 is shown diagrammatically a series of seven rings, all of which have the same rim diameter at 37 to fit the inner rim 35 on the cutting device, but each has a different inner rim diameter 36.

Figure 11:
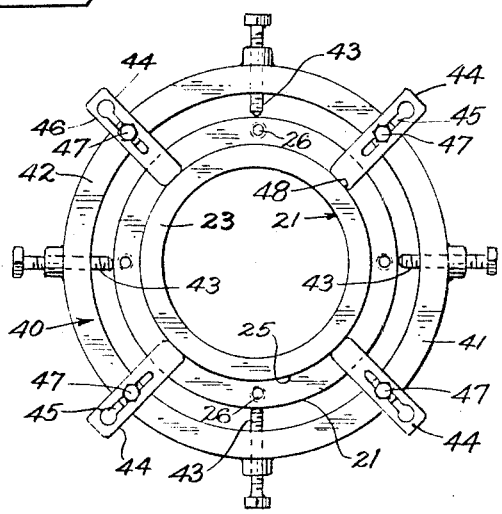
FIG. 11 is a plan view showing the four jaw chuck as it is positioned on the flange and made coplanar with the flange face.
Figure 12:
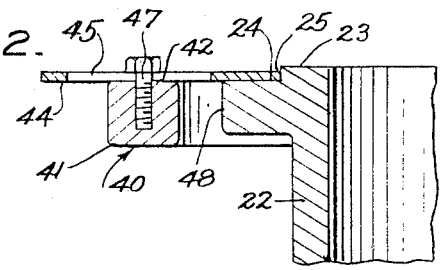
FIG. 12 is an enlarged view in section showing an outer flange portion aligned with the four jaw chuck.
Figure 13:
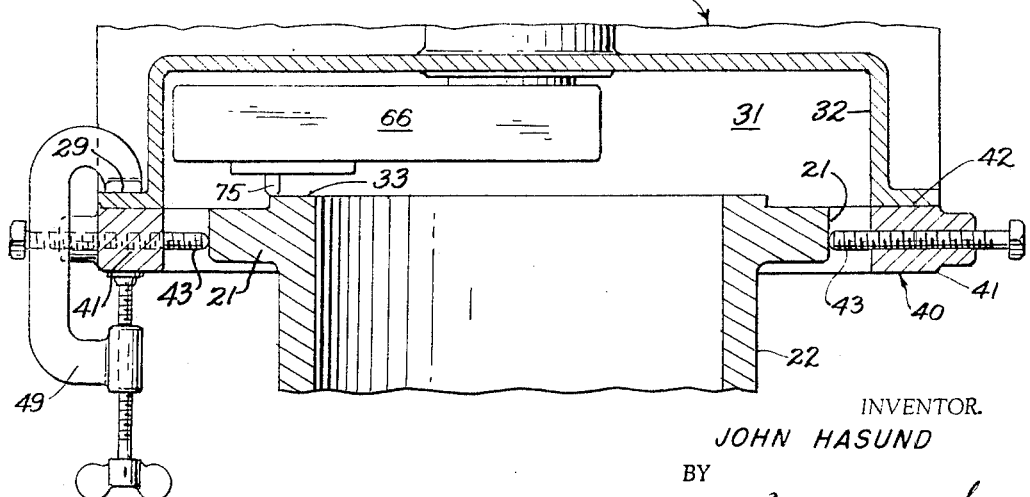
FIG. 13 is a view in elevation and in section showing a device according to the invention in position for facing a flange and retained on the four jaw chuck.

An alternate means for properly positioning the cutting tool on a flanged pipe or coupling member, as illustrated in FIGS. 10–13, entails the use of a four jaw chuck 40. Essentially, the chuck comprises a ring member 41 having roughly the same inner and outer diameters as the base 29 of the cutting tool 20 and a flat upper annular surface 42. Spaced apart circumferentially on the ring members 41 and threadedly mounted therein are four radially extending adjustable jaws 43. Portions of the jaws thus extend radially inwardly toward the center of the ring 41 and are adaptable to engage the edge of the pipe or coupling flange 21 being faced. As the chuck 41 is attached to a flange before positioning the cutting tool, its upper surface 42 must be made substantially coplanar with the inner face 23 of the flange being faced. As shown in FIGS. 11 and 12, this is accomplished by means of a series of locator bars 44 which are temporarily attached to the upper chuck surface 42 before its jaws 43 are tightened. The bars, made of rigid material, are somewhat elongated and each has a slot 45 extending longitudinally near one end. One end 46 of each slot is enlarged to allow the bar to slip over the head of a stud 47 which is temporarily threaded to the ring member 41. Thus, the bars 44 can be retained temporarily to the upper surface 42 of the ring member 41, and they extend inwardly to engage the flange surface 23. When all the bars are bearing flat against the flange surface 23, the upper surface 42 of the ring member 41 is in the same plane as the flange surface 23 being faced and the jaw members 43 can now be tightened against the edge 48 of the flange. By carefully controlling the radial positioning of the jaw members the ring member 41 can also be made concentric with the flange surface 23. After the jaw members 43 are fully tightened against the flange edge 48 the locator bars 44 can be removed from the ring member 41.

With either an adapter ring 33 or a four jaw chuck 40 attached to the flange 21, as described, the cutting tool 20 can now be attached thereto in a position exactly concentric with the flange bore 34. Generally, I prefer to utilize a plurality of C-clamps 49 to secure the tool 20 either to the four jaw chuck 40 or directly to a ring 33 positioned on the flange 21. The latter arrangement is illustrated in FIG. 10.

Describing now the cutting tool 20 in greater detail, with reference to FIG. 1, it comprises the frame housing 27, having a central tubular portion 50 supported by the legs 28. All of the latter three elements are preferably cast as a single integral unit from a relatively light metal such as aluminum. Fitted snugly within the tubular housing portion 50 is a concentric sleeve member 51 that is retained therein by a series of machine screws 52 spaced around and extending through an upper flange 53 of the sleeve member 51. The sleeve member is preferable formed from a heavier, harder material such as cast iron and is provided with internal threads 54 adapted to engage the outer threads 55 of a drive housing 56. The aforesaid structural features of the invention are important because they provide a unique combination of light weight and yet high strength and durability.

A pair of bearings 57 and 58 are located at the upper and lower ends of the drive housing 56 which rotatably supports a drive tube 59. The drive housing 56 can be raised or lowered within the tubular housing portion 50 to adjust the depth to cut to be taken off the face of the pipe, or coupling flange. At its upper end the drive housing 56 has a radially extending flange 60 with a knurled edge, and the upper surface of this flange 60 is scribed with radially extending lines that provide the necessary indicia, so that an amount of rotation of the drive housing 56 within the sleeve 51 can be related to the depth of cut. In order to lock the drive housing 56 in position once the desired depth of cut has been set, I provide a locking collar 61 at the top of the sleeve 51. This collar comprises an integral semicircular portion 62 that is joined to the flange 53 of the main sleeve portion 51 below a pair of curved extensions 63 attached to the ends of the semicircular portions 62 that fit partially around and then extend radially outwardly form the drive housing 56. These extensions 63 are not connected axially to the drive housing directly below and, being somewhat flexible, are able to grip the drive housing 56 when pressed together. Thus, the extensions 63 are normally parallel at their outer ends, but when pressed towards each other they will tighten around the drive housing and thereby hold it at the predetermined preset position. A link 64 is threadedly connected to each extension 63, and fixed to the link is a locking lever 65 for turning the link. As the lever is moved down, the link turns and cams the extensions together to tighten them around the driving housing 56. When the depth of cut is to be reset, the locking lever 65 is raised to release the locking band extensions 63 and allow the drive housing 56 to be rotated to a new position.

The drive tube 59 is of rugged construction because it carries on its lower end a cutter head 66 that performs the actual metal cutting of the tool 20. At its upper end a bevel gear 67 is fixed to the drive tube 59 which is meshed with and driven by a bevel pinion 68 mounted on a drive shaft 69. A worm drive may be used if preferred. The drive tube 59 is hollow and provides a mounting for the feed shaft 70 that will be described later.

The cutter head 66 preferably is an arm having a splined slot 71 to receive a tool carriage 72 having square holes 73, 74 adapted to receive selectively the cutting tool 75 shown in hole 73. A feed screw nut 76 is secured to the carriage 72 and engages a cross feed screw 77, so that rotation of the latter will feed the carriage 72 in or out along the slot 71. The screw 77 is free at one end 78 and is journaled at its other end 79 in a cylindrical thrust bearing assembly 80 mounted in the cutter head 66. Fixed to the screw 77 at the point where it enters the thrust bearing assembly 80 is a bevel gear 81 that engages and is meshed with a like gear 82 on a feed shaft 83, the latter being journaled in the drive tube 59 for rotation independent therefrom.

The rear side of the bevel gear 81 engages a front thrust bearing 84 mounted in the assembly 80. Threaded to the extreme end of the screw 77 is a retainer nut 85 which engages a rear thrust bearing 86 at the other end of the thrust bearing assembly 80.

Because of their location within the cutter head 66 and their proximity to waste chips and debris during operation of the tool, the bevel gears 81 and 82 would normally be vulnerable to excess wear or damage. In the present invention I have eliminated this problem by providing a guard member 89 that is retained in the cutter head 66 around these bevel gears so that no debris or waste chips can contact the gears. The guard 89 comprises a thin-walled shell 90 which curves in cross section in a cylindrical shape somewhat greater than 180°. One end of the shell is completely open and is adapted to fit around the end of the thrust bearing assembly 80. A recess 91 in this end of the shell enables a retaining dowel or screw 92 to be inserted into the thrust bearing assembly 80 to secure the guard 90 at this point. At its other end the guard has an annular end wall 93 with a central bore 94 to receive the feed screw 77. An enlarged hub portion (not shown) may be provided around the bore 94 to accommodate an O-ring seal, if desired. The end wall 93 fits within a notch 97 in the cutter head 66 adjacent the meshed gears 81 and 82, and when properly installed, the shell portion 90 completely encloses the gears and prevents any chips or debris from interfering with their operation.

The feed shaft 70 extending upwardly through the drive tube 59 projects from the top of the tube and has a knob 100 which, if held by the hand, will stop rotation of the shaft 83 and cause gear 82 to rotate as the cutter head 66 is rotated, thereby causing the tool carriage 72 to move along the slot 71.

Another feature of novelty in my device includes the provision for obtaining in a simple manner, a reverse feed and at the same time an alternative (and slower) feed rate for the tool carriage when it is desired to make a smooth cut on the face 23 instead of a lined cut. When a pair of mating flanges 21 are bolted together the practice is to sandwich a gasket between the mating faces 23 to assure a leak proof joint at the coupling. One government regulation calls for each face to be resurfaced with a serrated cut of shallow depth with the furrows or serrations lying 32 to the inch. There are times, however, when a smoother surface is desirable on the faces 23 and I get this by the simple alternative reverse feed drive together with a less pointed cutting tool 75, now to be described.

As shown in FIGS. 8 and 9, my reversing drive mechanism comprises a small planetary gear drive housing 101 which can be nonrotatably secured to the top of the drive tube 59 by means of a hexagonal or other irregularly shaped nut 102 and a mating female open end 103 on the housing 101. A flat sided end portion 104 of the feed shaft 70 engages nonrotatably in the plate 105 in the housing 101.

Integral with the rotatable plate 105 is a ring gear 106 engaged by three pinions 107 journaled on pins 108 secured to the housing 101. A pinion gear 109 secured to a knob 110 is rotatably mounted in the housing 101 and meshes with the pinions 107 to complete a planetary gear system.

When the housing 101 and plate 105 are in engagement respectively with the nut 102 and squared end 104, the operator can effect a reversal and a reduction in feed rate of the tool carriage along the slot 71 merely by holding the knob 110 so it does not rotate with the housing 101. When the drive tube 59 is being rotated there will be no travel of the tool carriage in its slot 71 unless the feed shaft 83 is either held stationary or is rotated at a speed faster than the tube 59 is being rotated.

The effect of holding the cross feed knob 100 is to feed the cutting tool across the face 23 at the speed controlled by the ratio of the gears 81 and 82 and the pitch of the feed screw 77.

The effect of placing the gear housing 101 on the tool is to provide means for reducing the speed of travel of the cutting tool 75 across the face 23 and thereby make a smoother cut, with more furrows to the inch, or none, depending upon the shape of the cutting tool end. When in place, and if the cutter head is rotating, the tool carriage will not move in its slot 71 unless the operator holds the knob 110 against rotation. When the knob 110 is held, the nut 102 rotates the housing 101, which carries the pinion shafts 108 and the idler gears 107. Since the pinion 109 is held against rotation, the idler gears will rotate the plate 105 through the ring gear 106, rotating and driving the feed shaft 70. With the gears as shown, I obtain a two and a half to one speed reduction and due to the planetary, the rotation imparted to the cross feed screw 77 is reversed in comparison to the rotation produced by holding the knob 110 with the housing 101 removed.

An additional advantage of the gear unit 101 is to return the cutting tool 75 to its starting position when more than one pass or cut on the face 23 is to be taken. This obviates providing a reversing drive for the drive shaft 69, or the provision of a hand crank to engage the feed screw 48 through an opening in the end of the cutter head 66.

The setup and operation of my device follows: Suppose that the diameter of the flange rim 25 adjacent the surface 23 is eight inches and the circular inner rim 35 of the tool 20 is ten inches. The operator can go to the stock of adapter rings 33 and select one in which the diameter of its inner rim 36 is slightly larger than eight inches and in which its outer rim 37 is a snug fit on the rim 35. The approximate radial dimension between the outer rim 37 and the inner rim 36 on the ring 33 is one inch. The operator can either place the ring 33 on the flange and bring the tool into position or he can place the ring 33 on the tool and bring these parts into the positions shown in FIGS. 6 and 7. What procedure he follows here will depend on whether the flange 23 to be surfaced is flat, vertical or facing downwardly.

If a much larger size of flange is to be faced, it may be that the four jaw chuck 40 will be more conveniently utilized. The method for installing this fixture has been previously described. In any event, the operator will then secure the cutting device 20 in place by the C-clamps 49 and then turn his attention to adjusting the cutting tool 75 by means of the knurled flange on the drive housing 56. If the cut is to leave a serrated face, a pointed tool 75 will be used and for each serration the tool can be fed toward and away from the face 23 by rotating the flange 60. The latter is calibrated to lend accuracy to this work. Each time the flange 60 is rotated to withdraw the tool the operator will grasp the knob 100 and hold it from rotation while the head 66 makes one revolution. This will move the tool carriage 72 inwardly, ready for the next circular cut on the face 23.

When the face 23 is resurfaced, the tool carriage can be moved outwardly on the head 66 simply by applying the housing 101 to the top of the knob 100 and holding the knob 100. Due to the planetary gearing, the travel outwardly will be two and a half times slower than when the knob 100 is held. If the operator desires to make a very smooth cut he will choose to do it on the outward travel stroke just described, with a tool 75 less pointed than when making a serrated cut.

Whether the flange is in a horizontal, vertical, or upside down position, the operator can easily and accurately position the cutting device to make the cut in situ by using either an adapter ring 33 or the four jaw chuck 40. The savings in time and cost with this tool and ring combination over having to take the flange to a specially equipped shop for resurfacing is a tremendous advantage and represents an important improvement in the art.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A cutting tool for facing an annular radial face comprising in combination:

a tubular body portion;

inner and outer independently rotatable concentric shafts housed therein and projecting from the ends thereof;

a sleeve affixed to and supporting said outer shaft and adjustably fitting in said body portion to adjust the position of said shafts axially of said body portion;

power applying means operatively connected to one end of said outer shaft;

a cutter housing mounted on the other end of said outer shaft;

a cutter tool assembly mounted in said housing for rotation therewith and for free radial movement relative thereto;

gear means linking said tool assembly to said inner shaft for accomplishing radial translation of said assembly by relative rotation between said shafts;

and a planetary type drive mechanism having a frame secured to said one end of said outer shaft, a ring gear rotatable with respect to said frame and keyed to said inner shaft, idler pinion gears in said frame engaging said ring gear, a center pinion gear engaging said idler pinion gears, and means for holding said center pinion gear against rotation, thereby slowing down the rotation of said inner shaft and translating said assembly.

2. In a cutting tool for facing an annular radial face of the type having an adjacent radial flange stepped from said face to provide a rim around said face concentric thereto, said tool being of a type having a tubular supporting body, a pair of independently rotatable concentric shafts housed therein and projecting from the ends thereof with a cutting tool and a gear-carrying head mounted respectively on one end of said shafts, power-applying means operatively connected to one of said shafts at their opposite end, and a sleeve affixed to and supporting said shafts and fitting in said body to adjust the position of said shafts axially of said body, the combination therewith of:

an annular ring having an inner periphery and an outer periphery;

said inner periphery having a diameter greater than said radial flange, adjustable locking means on said ring extendable radially inwardly to engage said radial flange;

means removably attached to one face of said ring at circumferentially spaced apart intervals and extending radially inwardly to engage the face of said radial flange before said adjustable locking means are tightened, said annular ring thereby being coplanar with the face of said radial flange;

and means for clamping said body to said ring, whereby said tool is secured with said shafts in concentric relation to said face in working position in situ, regardless of the angle or location of said face.

3. A cutting tool for facing an annular radial face, said tool comprising:

an interiorly threaded tubular supporting body portion;

inner and outer independently rotatable concentric shafts housed therein and projecting from the end thereof, said shafts being keyed for axial movement together;

an exteriorly threaded sleeve affixed to and supporting said outer shaft and engaging the threads of said body portion to adjust the position of said shafts axially of said body portion;

power applying means operatively connected to said outer shaft near one end;

a cutter head housing mounted on the other end of said outer shaft and extending from the axis thereof;

a cutter tool head slidably mounted in a slot in said head housing;

a rotatable feed screw threadedly attached to said cutter tool head, and gear means on said feed screw meshed with a gear means on said inner shaft for causing said feed screw to rotate and thereby accomplishing radial translation of said cutter tool head by relative rotation between said shafts;

removable guard means attached to said cutter head housing and surrounding both said gear means, said guard means thereby preventing chips and debris from contacting said gear means during operation of the cutting tool;

a planetary type drive mechanism removably secured at the end of said shafts opposite said tool head and having a frame keyed to rotate with said outer shaft;

a ring gear rotatable in said frame and keyed to rotate with said inner shaft;

idler pinion gears in said frame engaging said ring gear;

a center pinion gear engaging said idler pinion gears, and means for holding said center pinion gear against rotation, thereby slowing down the rotation of said inner shaft and slowly translating said tool assembly;

and means for stopping the rotation of said inner shaft when said planetary type drive mechanism is removed for translating said tool assembly at a speed faster than that obtained when using said planetary mechanism.

References Cited by the Examiner

UNITED STATES PATENTS

| | | | |
|---|---|---|---|
| 1,811,893 | 6/1931 | Parker | 82—4 |
| 2,283,323 | 5/1942 | Erhardt | 82—4 X |
| 2,553,570 | 5/1951 | Flynn | 82—4 |
| 2,699,604 | 1/1955 | Ingwer et al. | |

WILLIAM W. DYER, JR., *Primary Examiner.*

L. VLACHOS, *Assistant Examiner.*